United States Patent [19]

Thomas, Jr.

[11] 3,723,006

[45] Mar. 27, 1973

[54] METHOD AND APPARATUS FOR SELECTING AND HANDLING PARTICULATE SPECIMENS USING A VACCUM PROBE

[75] Inventor: Roy L. Thomas, Jr., Medway, Mass.

[73] Assignee: Charles Supper Company, Natick, Mass.

[22] Filed: May 7, 1971

[21] Appl. No.: 141,178

[52] U.S. Cl. .................356/30, 250/51.5, 269/21, 356/244

[51] Int. Cl. .............................G01n 23/20

[58] Field of Search.........................269/21; 356/124–127, 30, 31, 244; 250/51.5

[56] References Cited

UNITED STATES PATENTS 3,515,484   6/1970   Normand ..........................356/124

3,614,229   10/1971   Denne ..................................356/31

Primary Examiner—Ronald L. Wibert
Assistant Examiner—Orville B. Chew, II
Attorney—John H. Coult

[57] ABSTRACT

This disclosure depicts methods and apparatus for selecting, holding, and manipulating particulate specimens, and for assisting in observing, positioning, and mounting such specimens for analysis. In each embodiment illustrated a hollow vacuum probe is supported for rotation and translation in a V-block. In one embodiment the probe is retained on the block by magnetic forces, and in another embodiment by mechanical forces. A method is disclosed for mounting particulate specimens on a goniometer head for study by X-ray diffraction methods.

16 Claims, 5 Drawing Figures

1

METHOD AND APPARATUS FOR SELECTING AND HANDLING PARTICULATE SPECIMENS USING A VACCUM PROBE

BACKGROUND OF THE INVENTION

The study of minute crystals and other particles is hampered by the difficulties encountered in the selection, handling, manipulation, and mounting of the crystals. For example, a crystallographer wishing to mount a crystal for X-ray diffraction analysis selects the crystal by causing it to adhere to the end of a glass fiber or "whisker." The fiber is mounted in a goniometer head and the crystal observed through a microscope, typically of the petrographic type. If the morphologic position of the crystal on the fiber happens to be far removed from the position desired for analysis, and compensating adjustments of the goniometer head are not possible, the crystal is transferred to another fiber in the hope of achieving a more favorable crystal position. This trial and error process continues until the crystallographer is able to achieve the desired crystal orientation on the goniometer head.

Similar problems exist in other fields wherein the selection and manipulation of particulate specimens is involved.

OBJECTS OF THE INVENTION

It is an object of this invention to provide methods and apparatus for selecting, holding, and manipulating crystals and other particulate specimens.

It is another object to provide improved methods and apparatus for rapidly and accurately mounting crystals and other particulate specimens for inspection and analysis.

It is yet another object to provide apparatus for selecting and handling minute particulate specimens which is relatively inexpensive to fabricate and which is extremely simple in construction and convenient in use.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

It is contemplated that apparatus embodying the teachings of this invention will find use in many fields. FIGS. 1–4 show a preferred embodiment intended for use especially by crystallographers in selecting, manipulating and mounting crystal specimens.

Figure 1:
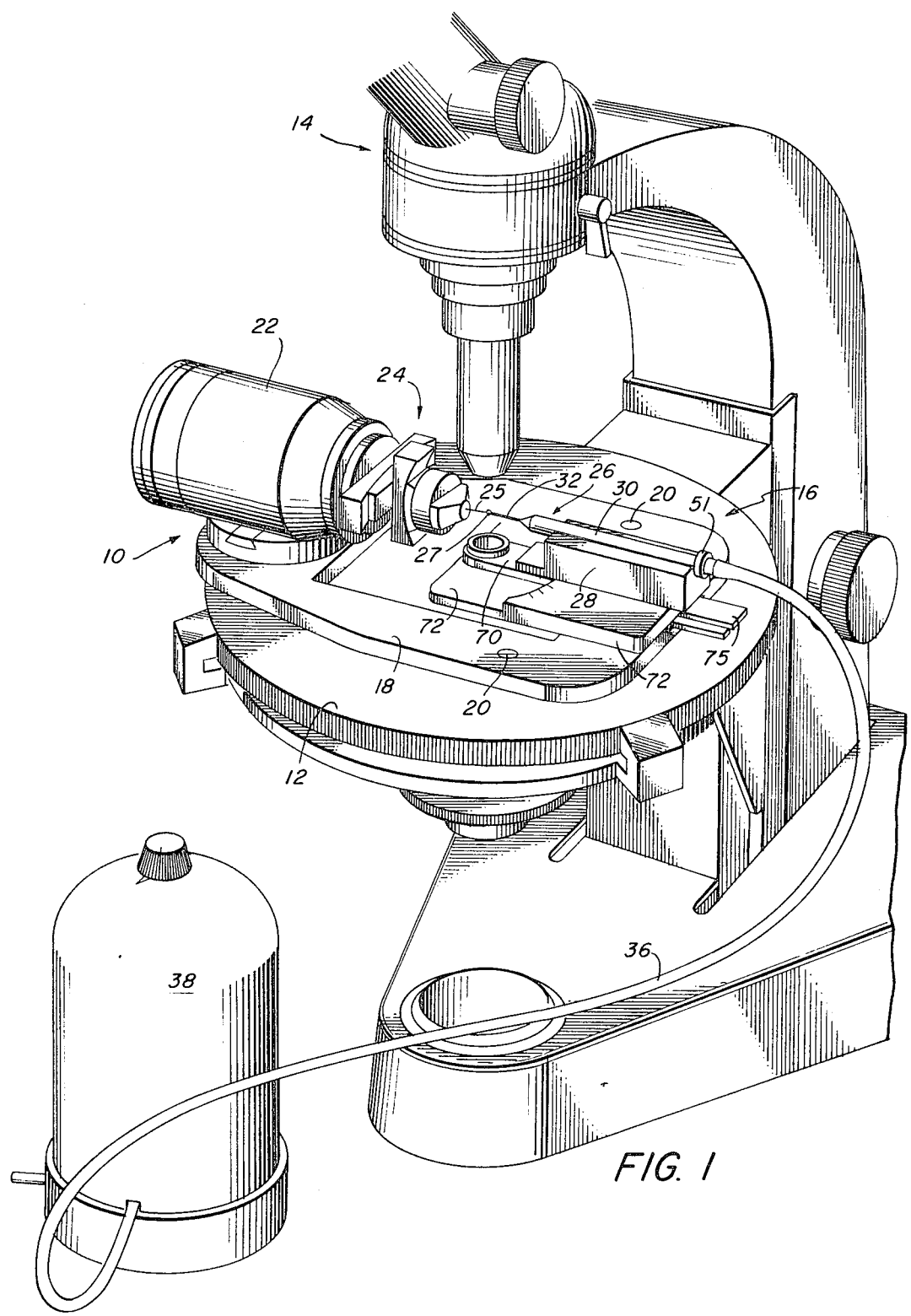
FIG. 1 is a perspective view of apparatus embodying this invention mounted for operation on a petrographic microscope.
Figure 2:
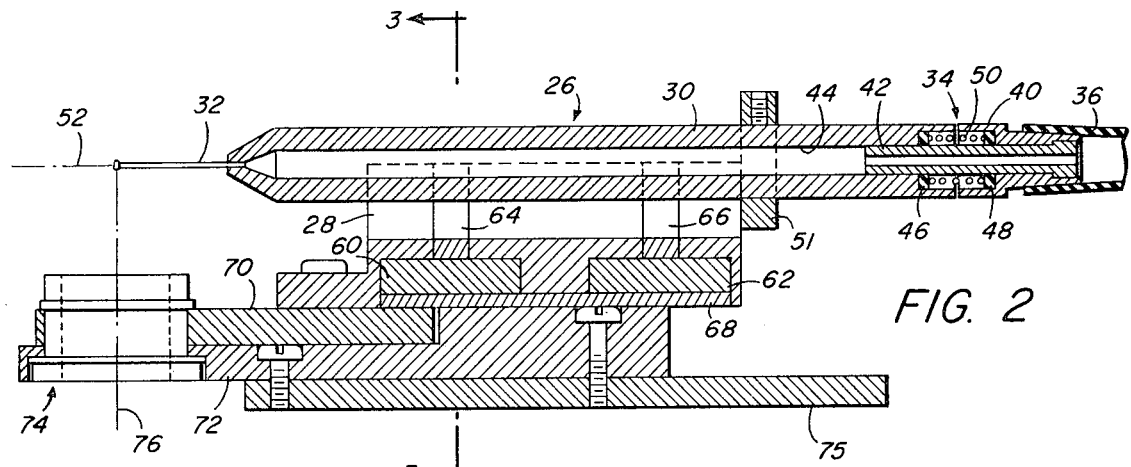
FIG. 2 is a fragmentary longitudinal sectional view through manipulating apparatus shown in FIG. 1.

FIG. 1 shows a petrographic microscope 10 having a rotary stage 12 on which is mounted a spindle stage assembly 14.

The stage assembly 14, exclusive of the specimen handling apparatus 16, is commercially available and includes a frame 18 which is attached by screws 20 to the rotary stage 12 of the microscope 10.

A spindle 22 mounted on the frame 18 carries a goniometer head 23. The goniometer head 23 permits precise adjustments in the spatial position and orientation of a specimen 24, normally mounted as shown on the distal end of a fiber 25 secured on the tip of the goniometer head 23. The spindle 22 provides for rotation of specimen 24 as it is being observed through the microscope 10, and for precise positioning of the specimen 24 in azimuth.

According to this invention apparatus 16 for selecting, holding, and manipulating the specimen 24 is provided. In the illustrated embodiment, the apparatus 16 comprises a hollow vacuum probe 26 which is supported for rotation and translation by a V-block 28.

The probe 26 is illustrated as having a tubular body 30 on one end of which is secured a hollow needle 32. On the opposed end of the body 30 is a swivel coupling 34. A flexible vacuum tube 36 connects the coupling 34 to a source of vacuum, here shown as a small vacuum pump 38.

The swivel coupling 34 comprises an end fitting 40 having a cylindrical bore which receives an inner pipe 42 extending into the bore 44 in the probe body 30. A vacuum seal is provided by a pair of coaxial gaskets 46, 48, one in the body 30 and one in the fitting 40. A coil spring 50 retains the washers 46, 48 in their proper positions and establishes a tension in the coupling 34.

A lockable collar 51 on the probe body 30 may be used to limit and control the axial position of the probe 26.

In accordance with this invention, support means are provided for supporting the probe 26 for stable and controlled translation along a longitudinal axis 52 of the probe 26, and for rotation about the axis 52. In the illustrated embodiment, the support means are depicted as taking the form of a V-block 28. The V-block 28 includes means for automatically positioning and aligning the probe 26, shown as taking the form of convergent surfaces 56, 58 arranged in a V cross-sectional configuration. Arrangements of convergent surfaces in other configurations for accomplishing the described automatic positioning and aligning of the probe 26 are contemplated.

Figure 4:
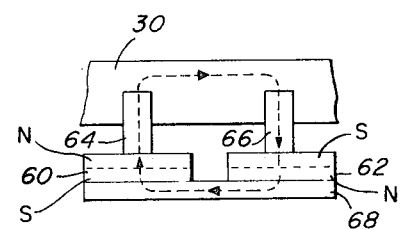
FIG. 4 is a schematic diagram of a magnetic circuit established in the FIGS. 1–3 embodiment.

In order to hold the probe 26 on the block 28, the support means for the probe 26 preferably includes means for firmly retaining the probe 26 on the block 54, while allowing rapid and unobstructed removal of the probe 26 from the block 54 by user. Toward this objective the FIGS. 1–4 embodiment incorporates means for establishing a magnetic circuit through the probe 26 and the block 28 such that the probe 26 is retained on the block 28 by magnetic forces. Referring particularly to FIG. 4, in the illustrated embodiment the means for establishing the magnetomotive force in the magnetic circuit comprises a pair of oppositely oriented ceramic disc magnets 60, 62. The block 28 may be composed of a non-ferromagnetic material such as aluminum. A pair of ferromagnetic (e.g., steel) inserts 64, 66 engage the magnets 60, 62 and conduct the magnetic flux generated by the magnets 60, 62 to the body 30 of the probe 26, also of a ferromagnetic material, preferably steel. A ferromagnetic connector plate 68 magnetically interconnects the opposite poles of the magnets 60, 62. Placement of the probe 26 in the V-groove on the block 54 completes the magnetic circuit through the probe 26, causing an attraction of the probe 26 by the block 28.

Using the vacuum probe 26, a crystallographer may easily pick up a desired specimen 27 and hold it on the V-block 28 under the microscope 14 for inspection. The position of the specimen 24 on the end of the probe needle 32 may be easily varied by jiggling the specimen 27 with a prod. Since the specimen 24 is not glued to the needle 32, but is adhered thereto by vacuum forces alone, such positional adjustments of the specimen 24 may be rapidly and easily made.

Further, by this invention the probe 26 may be easily removed from the block 28 (e.g., to pick up a specimen) and returned to the block 28. While being retained by the block 28, the probe 26 may be rotated and translated in a precise and controlled manner, a capability which is extremely valuable to one such as a crystallographer who is trying to visually examine a specimen 24 under a microscope.

One of the many applications of apparatus implementing this invention which has proven to be particularly useful to crystallographers is the mounting of crystal specimens on a goniometer head for subsequent analysis by x-ray diffraction techniques. As is well known, the crystallographer must position the crystal specimen very precisely on the end of the fiber held by the goniometer head in order that the x-ray diffraction records he makes of the crystal specimen may be useful to determine the morphological and other characteristics of the specimen.

Using apparatus according to this invention, as shown, for example in FIGS. 1-4, a crystallographer may quickly, easily, and accurately mount a specimen 24 on a goniometer head 23. After loading the goniometer head 23 with a fiber 25 and positioning the tip of the fiber 25 at the intersection of the longitudinal axis of the head 23 and the longitudinal axis 52 of the probe 26, a specimen 24 to be mounted is selected with the vacuum probe 26. The probe 26 is then placed on the V-block 28 and inspected through the microscope 14. The position of the specimen 24 on the probe 26 may be varied by jiggling the specimen. In addition, the specimen 24 may be rotated and translated in a controlled manner by rotation and translation of the probe 26 on the block 28.

Using the described techniques, the position of the specimen 24 on the probe 26 is adjusted until the specimen 24 has a predetermined desired orientation related to the orientation which is desired for the specimen 24 to have when secured to the fiber 25. Adhesive is then applied to the tip of the fiber 25. To attach the specimen 24 to the fiber 25, the probe 26 is simply translated along the block 54 until the specimen 24 engages and is secured upon the free end of the fiber 25.

In some applications, a crystallographer may prefer to optically align an axis of a crystal specimen with a reference axis such as the axis of the fiber or probe he is then using, and then accurately rotate the crystal in the plane of the frame 18, through a predetermined angular displacement before mounting the specimen on the goniometer head. To this end, the illustrated support means for the probe 26 includes a mounting plate 70 for the V-block 28 supported to pivot on a member 72. The support apparatus 16 is detachably retained on the frame 18 by a sliding dovetail joint comprising a dovetailed member 75 secured to member 72 which has a manually flexible split tail. The member 75 is slideably received in a mating dovetail groove in the frame 18. The member 72 carries an azimuth scale 73 which may be used to accurately position in azimuth the mounting plate 70 with respect to the member 72, and thus with respect to the axis of the goniometer head 23.

A pivot assembly 74 has its axis 76 (also the optical axis of the microscope's specimen illumination system) coincident with the point of intersection of the longitudinal axis of the head 23 and the probe axis 52 such that the probe 26 may swivel about the said point of intersection.

Thus, by this invention methods and apparatus are provided which greatly simplify and reduce the time required to mount crystal specimens for x-ray diffraction analysis.

Figure 5:
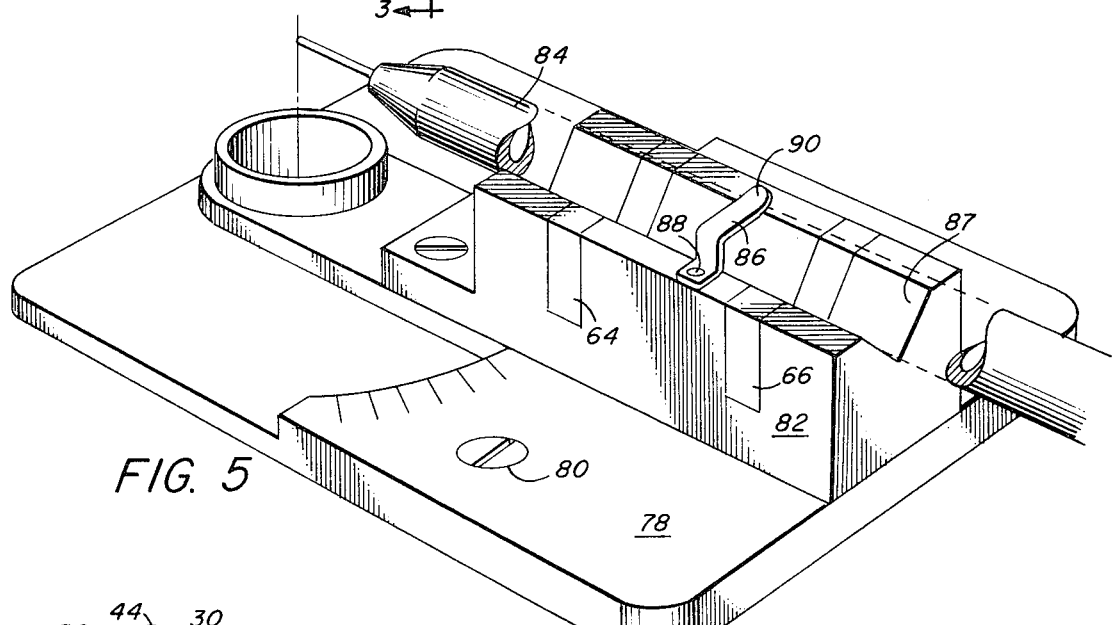
FIG. 5 is a perspective view of an alternative embodiment of the invention.
Figure 3:
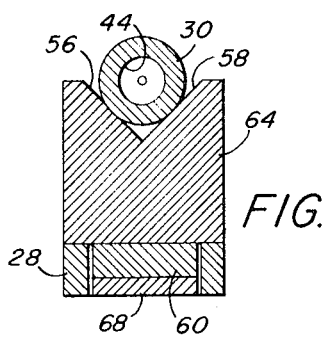
FIG. 3 is a sectional view along lines 3—3 in FIG. 2.

FIG. 5 shows another embodiment of the invention adapted for general use as a microscope accessory. The FIG. 5 apparatus comprises a mounting plate 78 having a pair of screws 80 for attaching the apparatus to a microscope stage.

A V-block 82 for supporting a vacuum probe 84, which may be structured for example, similar to the probe 26 shown in the FIGS. 1-4 embodiment, is secured to the mounting plate 78. The V-block 82 serves the same functions as the V-block 28 in the FIGS. 1-4 embodiment; however, rather than providing retention of the probe 84 by magnetic forces, the V-block 82 includes spring means in the form of a leaf spring 86 for retaining the probe 84 while providing for precise and controlled translation and rotation of the probe 84.

The spring 86 is illustrated as being pivotable on the block 82 by means of a screw 88. A tab 90 on the spring 86 offers easy access to the tip of the spring 86 by the user. The spring has an operative position, as shown, wherein it is cantilever supported to extend over V-groove 92 in the block 82. When in this position, the spring 86 is capable of firmly holding probe 84 in the V-groove 92 by the natural restorative forces in the spring 86.

To free the probe, the tab 90 is lifted and the spring 86 rotated to a position wherein it is parallel with the V-groove 92.

The invention is not limited to the particular details of construction of the embodiments depicted, and it is contemplated that various and other modifications and applications will occur to those skilled in the art.

Therefore, because certain changes may be made in the abovedescribed apparatus without departing from the true spirit and scope of the invention herein involved, it is intended that the subject matter of the above depiction shall be interpreted as illustrative and not in a limiting sense.

What is claimed is:

1. A particulate specimen holder for use with microscopes and the like, comprising:
   hollow probe means having an operative end for engaging a specimen, at least a portion of said probe means having a cylindrical outer surface;
   flexible tube means for connecting the opposed end of said probe means to a source of vacuum to establish a vacuum at said operative end of said probe means; and
   support means for supporting said probe means for translation along a longitudinal axis of said probe means and for rotation about said axis, said probe means being removable from said support means to pick up a particulate specimen by vacuum forces and being adapted when retained by said support means for manual translation and rotation to allow inspection and positioning of said specimen.

2. The apparatus defined by claim 1 wherein said support means includes automatic positioning means including a pair of convergent surfaces for receiving and supporting said probe means, said support means further including spring means for holding said probe means against said convergent surfaces by the restorative forces in said spring means.

3. The apparatus defined by claim 2 wherein said support means includes a block having a V-groove formed in the upper surface thereof, the sides of which constitute said convergent surfaces.

4. The apparatus defined by claim 3 wherein said spring means comprises a leaf spring cantilever-supported to extend over said convergent surfaces.

5. The apparatus defined by claim 1 wherein said probe means is ferromagnetic and wherein said support means includes magnetomotive means for producing magnetic flux and magnetically conductive means for completing a magnetic circuit through said magnetomotive means and said probe for effecting said retention of said probe means by said support means.

6. A particulate specimen holder for use with microscopes and the like, comprising:
   hollow probe means having an operative end for engaging a specimen, at least a portion of said probe means having a cylindrical outer surface;
   flexible tube means for connecting the opposed end of said probe means to a source of vacuum to establish a vacuum at said operative end of said probe means; and
   support means for supporting said probe means for translation along a longitudinal axis of said probe means and for rotation about said axis, said support means including:
   automatic positioning means defining convergent surfaces for receiving and supporting said portion of said probe means having said cylindrical outer surface, and
   means for establishing a magnetic circuit through said portion of said probe means and said positioning means whereby said probe means is attracted to said support means by magnetic forces,
   said probe means being removable from said support means to pick up a particulate specimen by vacuum forces and being adapted when retained by said support means for manual translation and rotation to allow inspection and positioning of said specimen.

7. The apparatus defined by claim 6 wherein said support means comprises a block having a V-groove formed in the upper surface thereof for receiving said probe means, said block including magnetic means.

8. The apparatus defined by claim 7 wherein said probe means comprises a ferromagnetic barrel for reception in said V-groove and connected thereto a hollow needle which defines said operative end of said probe means.

9. The apparatus defined by claim 6 wherein said probe means includes an axially adjustable collar for defining limitation of axial movement in one direction of said probe means in said support means.

10. A particulate specimen holder for use with microscopes and the like, comprising:
    hollow probe means having an operative end for engaging a specimen, at least a portion of said probe means having a cylindrical outer surface;
    flexible tube means for connecting the opposed end of said probe means to a source of vacuum to establish a vacuum at said operative end of said probe means; and
    support means for supporting said probe means for translation along a longitudinal axis of said probe means and for rotation about said axis, said support means including automatic positioning means defining convergent surfaces for receiving and supporting said portion of said probe means having said cylindrical outer surface, said support means including spring means cantilever-supported to extend over said convergent surfaces and positioned to hold said probe means against said convergent surfaces by the restorative forces in said spring means, said probe means being removable from said support means to pick up a particulate specimen by vacuum forces and being adapted when retained by said support means for manual translation and rotation to allow inspection and positioning of said specimen.

11. Apparatus for use in microscopic inspection and in mounting for x-ray diffraction analysis of crystals and other particulate specimens, comprising:
    a rigid frame adapted to be mounted on a microscope stage; means for mounting a goniometer head on said frame; and a particulate specimen holder, comprising:
    hollow probe means having an operative end for engaging a specimen, at least a portion of said probe means having a cylindrical outer surface,
    flexible tube means for connecting the opposed end of said probe means to a source of vacuum to establish a vacuum at said operative end of said probe means, and
    support means for supporting said probe means on said frame such that a longitudinal axis of said probe means intersects a longitudinal axis of a goniometer head mounted on said frame, said support means mounting said probe means for translation along said longitudinal axis of said probe means and for rotation about said axis thereof, said support means including automatic positioning means defining convergent surfaces for receiving and supporting said portion of said probe means having said cylindrical outer surface, said support means including means for establishing a magnetic circuit through said portion of said probe means and said positioning means, whereby said probe means is attracted to said support means by magnetic forces, said probe means being removable from said support means to pick up a particulate specimen by vacuum forces and being adapted when retained by said support means to allow manual rotation of the specimen and translation thereof to position the specimen at the intersection of said axes for mounting on the tip of a fiber held by the goniometer head.

12. The apparatus defined by claim 11 wherein frame includes pivoted mounting means for carrying said support means, said pivoted mounting means having an effective pivot axis which intersects said intersection of said axes.

13. The apparatus defined by claim 12 wherein said support means comprises a block having a V-groove formed in the upper surface thereof for receiving said probe means, said block including magnetic material.

14. The apparatus defined by claim 13 wherein said probe means comprises a ferromagnetic barrel for reception in said V-groove and connected thereto a hollow needle which defines said operative end of said probe means.

15. The apparatus defined by claim 14 wherein said probe means includes an axially adjustable collar for defining limitation of axial movement in one direction of said probe means in said support means.

16. A method of mounting particulate specimens on a goniometer head for x-ray diffraction analysis, comprising:

mounting the goniometer head on a rigid frame;

selecting a specimen to be mounted with a hollow vacuum probe connected to a source of vacuum;

supporting the probe on support means which supports the probe for translation along the longitudinal axis of the probe and for rotation about the axis;

mounting the support means such that the longitudinal axis of the probe intersects the longitudinal axis of the goniometer head;

supporting a specimen support fiber in the goniometer head;

mounting the frame on a microscope stage;

adjusting the position of the specimen on the probe by the use of the microscope until the specimen has a predetermined desired orientation related to the orientation which is desired for the specimen to have when secured to the fiber;

adjusting the goniometer head until the free end of the fiber is positioned at the intersection of said axes;

applying adhesive to the free end of the fiber; and translating the probe in the support means until the specimen engages and is secured upon the free end of the fiber.

* * * * *